United States Patent
Hinc

(10) Patent No.: US 8,869,857 B2
(45) Date of Patent: Oct. 28, 2014

(54) TIRE COMPRISING ELECTRICALLY NON-CONDUCTING COMPOUNDS AND A PATH THROUGH WHICH CHARGE CAN FLOW

(75) Inventor: Henry Hinc, Romagnat (FR)

(73) Assignees: Michelin Recherche et Techniques S.A., Granges-Paccot (CH); Compagnie Generale des Establissements Michelin, Clermont-Ferrand (FR)

( * ) Notice: Subject to any disclaimer, the term of this patent is extended or adjusted under 35 U.S.C. 154(b) by 975 days.

(21) Appl. No.: 13/001,282

(22) PCT Filed: Jun. 19, 2009

(86) PCT No.: PCT/EP2009/057668
§ 371 (c)(1),
(2), (4) Date: Mar. 28, 2011

(87) PCT Pub. No.: WO2009/156344
PCT Pub. Date: Dec. 30, 2009

(65) Prior Publication Data
US 2011/0174420 A1    Jul. 21, 2011

(30) Foreign Application Priority Data
Jun. 25, 2008 (FR) ................................... 08 54221

(51) Int. Cl.
*B60C 9/18*   (2006.01)
*B29D 30/16*  (2006.01)
*B29D 30/30*  (2006.01)

(52) U.S. Cl.
USPC ......................................... 152/526; 156/123

(58) Field of Classification Search
USPC ................................................. 152/526–538
See application file for complete search history.

(56) References Cited

U.S. PATENT DOCUMENTS
3,232,330 A    2/1966 Puls

FOREIGN PATENT DOCUMENTS
FR           2759946    *  8/1998
WO   WO 2007/097104    8/2007

OTHER PUBLICATIONS
Machine translation of FR 2759946, 1998.*

* cited by examiner

*Primary Examiner* — Justin Fischer
(74) *Attorney, Agent, or Firm* — Cozen O'Connor

(57) ABSTRACT

A tire (1) comprising a crown reinforcing belt, formed of a plurality of reinforcing plies (13, 14) superposed on one another, each reinforcing ply resulting from the circumferential winding of one or more ply portions, in which tire the faces of the circumferential ends of the said portions (13, 14) are butted together to form a butt joint (130, 140). An electrically conducting continuous linear element (20) runs circumferentially over the radially upper part of each of the plies and crosses from the radially upper part of a first reinforcing ply into the radially upper part of a second reinforcing ply superposed directly on it, passing between the two faces of a butt joint of the said second reinforcing ply, and in that the said continuous element (20) comprises an internal leader (21) running over all or part of the radially lower face of the radially internal reinforcing ply (14) of the said belt and an external leader (22) running over all or part of the circumference of the radially upper face of the radially external reinforcing ply (13) of the said belt.

12 Claims, 4 Drawing Sheets

TIRE COMPRISING ELECTRICALLY NON-CONDUCTING COMPOUNDS AND A PATH THROUGH WHICH CHARGE CAN FLOW

RELATED APPLICATION

This is a U.S. National Phase Application under 35 USC 371 of International Application PCT/EP2009/057668, filed on Jun. 19, 2009.

This application claims the priority of French patent application Ser. No. 08/54221 filed Jun. 25, 2008, the entire content of which is hereby incorporated by reference.

FIELD OF THE INVENTION

The field of the invention is that of tires intended to be mounted on transport vehicles. More specifically, the invention addresses the problem of the flow of electrical charge in tires made using rubber compounds that are not electrically conductive.

BACKGROUND OF THE INVENTION

With a view to improving the rolling resistance and to reducing fuel consumption, modern-day tires comprise rubber compounds which, by way of predominant filler content, contain electrically non-conducting fillers such as silica, which are used for example to make the tread strips. A tire of this type is described, by way of illustration, in publication EP 0 501 227.

Because of the very high resistivity of these compounds, their use has been accompanied by the development of numerous technical solutions for avoiding the build-up of static electricity, and for allowing charge to flow to the ground as the vehicle drives along. The disadvantages associated with the build-up of electrical charge are well known to equipment manufacturers, and have effects as diverse as disturbing the operation of the radio fitted to the vehicle, giving the occupant an electric shock as he/she gets out of the vehicle, or accelerated ageing of the tire as a result of the formation of ozone.

Hence, tire manufacturers have set themselves the task of bringing to market tires which do not have these disadvantages. Publication U.S. Pat. No. 5,518,055 describes a tire of which the tread strip, made of a non-conducting compound, is coated with a thin layer of conducting compound. This layer is in contact with the sidewall compounds, which are themselves also conductors of electricity, to allow electric charge to flow.

Another solution, set out in publication EP 0 658 452, involves placing an insert in the tread strip. This insert, which runs radially, preferably over the entire circumference of the tire, is made of an electrically conducting rubber compound and connects the external surface of the tread strip either to one of the crown reinforcing plies or to any other part of the tire that is contiguous with the tread strip and sufficiently electrically conducting, each of these plies being electrically conducting. Numerous improvements have been made to this principle, according to whether the tread strip comprises one or more layers of conducting or non-conducting materials, and these are set out by way of example in publications EP 0 925 903 or EP 0 963 302.

The object of all these methods is to connect the external surface of the tread strip with a part of the internal zone of the crown of the tire which is just adjacent to it, such as the sidewall, a crown reinforcing ply or carcass reinforcing ply, and which has properties of conducting electricity.

However, recent tire developments, again aimed at improving the rolling resistance, have led to a fairly widespread use of weakly electrically conducting compounds, based on silica, in most of the component parts of the tire liable to perform mechanical work during the running phase of the said tire. Thus, such compounds are used to produce the sidewalls, the carcass reinforcing plies, the crown reinforcing plies, or even the crown reinforcing profiled elements, in addition to their use in the tread strips.

Only those elements of the tire such as the bead reinforcing ring or the chafers, the function of which is to provide contact between the rim and the low region of the casing, are made using compounds containing a carbon-based filler, and still have the property of conducting electricity.

SUMMARY OF THE INVENTION

It is an object of the invention to provide a solution to the conducting of electrical charge in tires made essentially from weakly or very weakly electrically conducting rubber compounds.

What is meant by a weakly electrically conducting rubber material is a material based on rubber that has a resistivity of $10^8$ Ohms/cm or higher. Likewise, an electrically conducting rubber material means a rubber-based material with a resistivity of less than $10^6$ Ohms/cm.

One aspect of the invention relates to a tire intended to be mounted on a wheel, and which is especially designed to reduce the rolling resistance. The tire comprises:

A tread strip, the radially external surface of which is intended to be in contact with the ground, the said tread strip being, as a general rule, made up of a weakly electrically conducting compound and comprising a means allowing electricity to be conducted, like the one described for example in publication EP 0 658 452.

A crown reinforcing belt, formed of a plurality of reinforcing plies superposed on one another, each reinforcing ply comprising threads, parallel to one another, coated with a weakly electrically conducting rubber compound, and making a given angle with the circumferential direction. The crown reinforcing belt is in contact with the radially internal surface of the tread strip, and more specifically with the means that allows electricity to be conducted that is arranged in the tread strip.

A bead region intended to ensure close contact between the wheel and the tire, comprising bead reinforcing rings and chafers in contact with the wheel, the said chafers generally being formed from an electrically conducting rubber compound.

One or more carcass reinforcing plies superposed on one another, anchored by their radially internal ends on the bead reinforcing rings, and also comprising threads coated with a weakly electrically conducting rubber compound. The threads are parallel to one another and make a given angle, generally 90% with the circumferential direction. At its centre, the carcass reinforcing ply is in contact with the radially internal ply of the crown reinforcing belt.

A sidewall zone, intended to protect the carcass reinforcing ply and formed, as a general rule, from a weakly electrically conducting rubber compound.

The term thread is to be understood in an entirely general sense, encompassing a monofilament, a multifilament, a cord or folded yarn or equivalent assembly, and irrespective of the textile or metallic material of which the thread is made or of the treatment it may have undergone, for example a rubberising or a surface treatment, to encourage it to bond closely to the rubber.

The problem which then arises in the type of tire described hereinabove is that of providing a conducting path between the tread strip and the rim, because the reinforcing plies are no longer able to conduct electrical charge between the crown of the cover and the carcass reinforcing ply.

An object of the invention is to provide a solution to this problem by proposing a tire of the above type that comprises a path along which charge can flow.

One aspect of the invention relates to a tire comprising a crown reinforcing belt, formed of a plurality of reinforcing plies superposed on one another. Each reinforcing ply results from the circumferential winding of one or more ply portions comprising threads, parallel to one another, coated with a weakly electrically conducting rubber compound, and making a given angle with the said circumferential direction, in which tire the faces of the circumferential ends of the said portions are butted together to form a butt joint.

This tire is characterized in that an electrically conducting continuous linear element runs circumferentially over the radially upper part of each of the plies and crosses from the radially upper part of a first reinforcing ply into the radially upper part of a second reinforcing ply superposed directly on it, passing between the two faces of a butt joint of the said second reinforcing ply, and in that the said continuous element comprises an internal leader running over all or part of the radially lower face of the radially internal reinforcing ply of the said belt and an external leader running over all or part of the circumference of the radially upper face of the radially external reinforcing ply of the said belt.

All that is then required is for the external leader of the linear element to be brought into contact with the internal surface of the tread strip. If this surface is also formed of a weakly electrically conducting material then, in the known way, means will need to be provided to conduct electricity between the exterior surface of the tread strip that is intended to be in contact with the ground, and the radially internal part of the tread strip and this means, such as an insert, will need to be brought into contact with the external leader running over the radially external surface of the crown belt.

Likewise, the internal leader is in contact with the radially external surface of the carcass reinforcing ply. If the latter is formed of a weakly electrically conducting rubber compound, then once again, in the known way, means will need to be provided to conduct electricity from the radially upper face of the centre of the carcass reinforcing ply as far as the internal faces of the chafers, and the said internal leader will need to be positioned in such a way that it is in contact with the said means arranged on the carcass reinforcing ply.

In this way, electrical charge will be conducted from the exterior surface of the tread strip in contact with the ground as far as the rim of the wheel.

The continuous linear element may be formed of one or more continuous threads coated with an electrically conducting rubber compound or, alternatively, of a thin and narrow strip likewise made of an electrically conducting material.

Another aspect of the invention is directed to a method for producing a crown reinforcing belt of the type suitable for building into a tire according to an embodiment of the invention.

BRIEF DESCRIPTION OF THE DRAWINGS

The description that follows is based on some preferred embodiments of the invention and on FIGS. 1 to 8 in which.

DETAILED DESCRIPTION OF THE DRAWINGS

Figure 1:
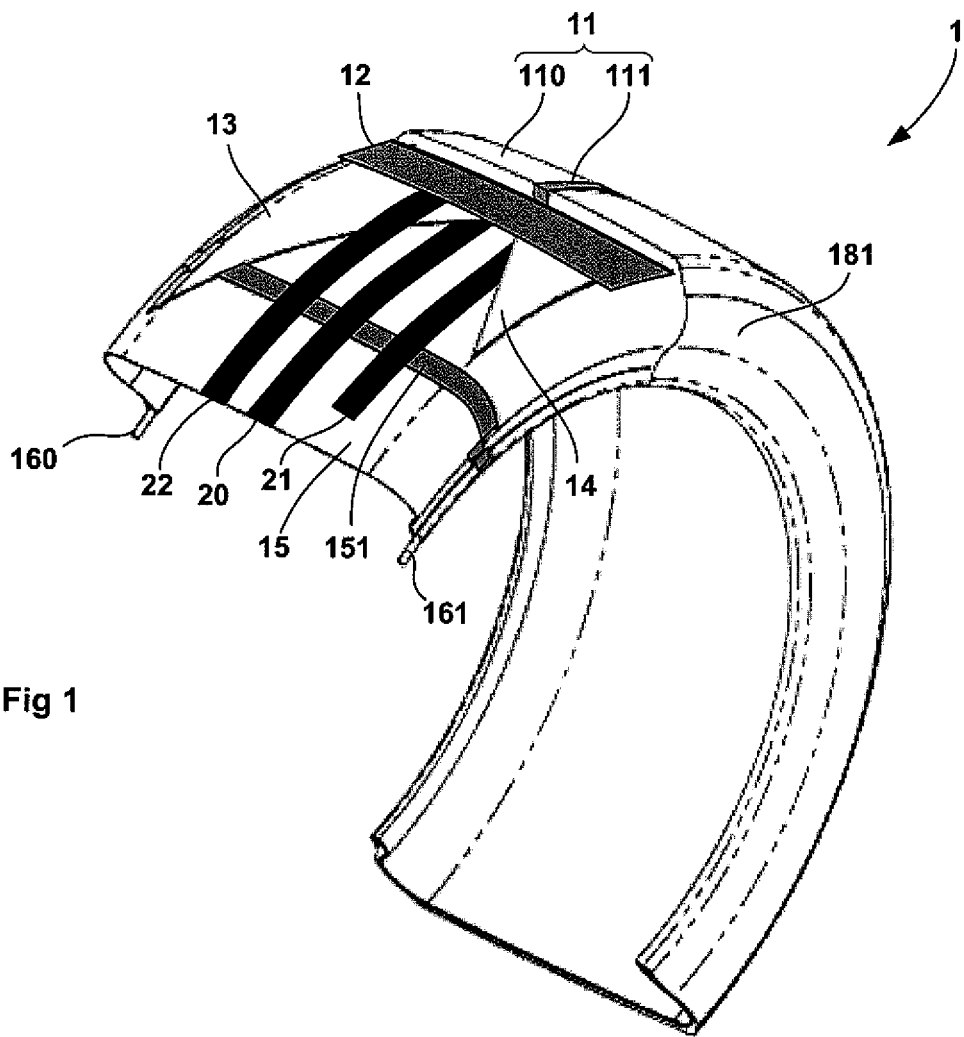
FIG. 1 depicts a schematic perspective view of a tire according to the invention.

The tire 1 depicted in FIG. 1 for the purposes of illustrating the invention comprises a tread strip 11 comprising means 110, 111, 12 for conducting electricity between the exterior surface of the tread strip intended to be in contact with the ground, and the radially internal part of the said tread strip.

These means may involve providing a tread strip made using an electrically conducting rubber compound or, for preference, creating a tread strip 11 formed from a weakly electrically conducting compound 110 and comprising an insert 111 passing radially through the tread strip. The tread strip 11 may also comprise a sublayer 12 itself formed of an electrically conducting compound or comprising a means allowing charge to flow similar to the one in the tread strip.

The crown reinforcing belt is made up of two reinforcing plies 13 and 14 the threads of which make a given angle with the circumferential direction of the tire.

The carcass reinforcing ply 15 is anchored by its two radially lower ends on bead reinforcing rings 160 and 161.

Figure 2:
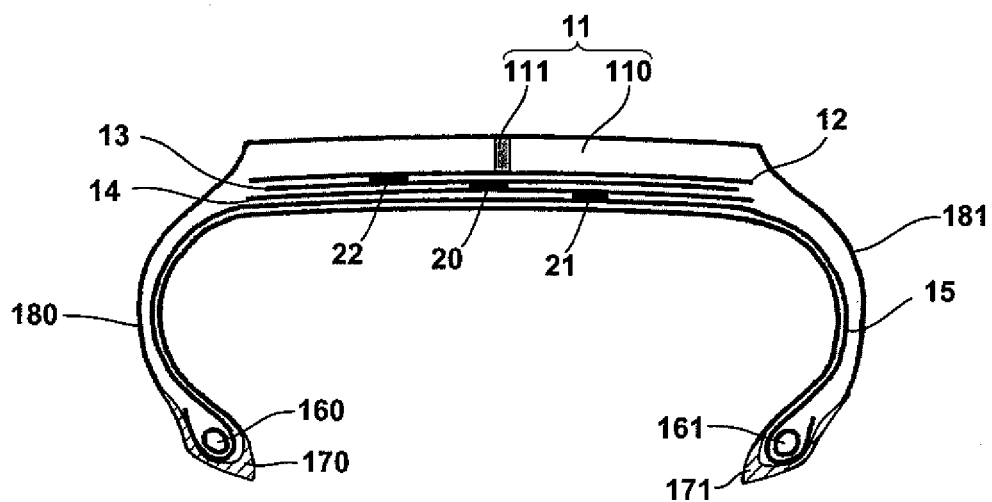
FIG. 2 depicts a schematic sectioned view of this tire.
Figure 3:
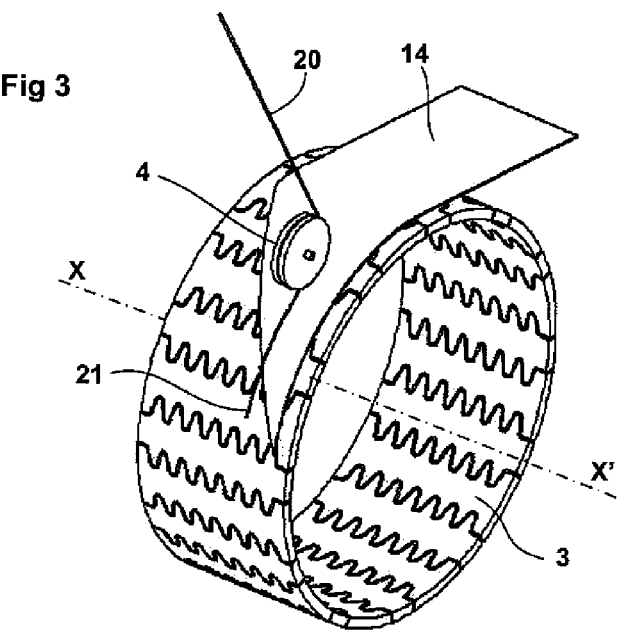
FIGS. 3, 4, 5 and 6 depict schematic perspective views of the various stages of a preferred way of producing a crown reinforcing belt according to the invention.
Figure 4:
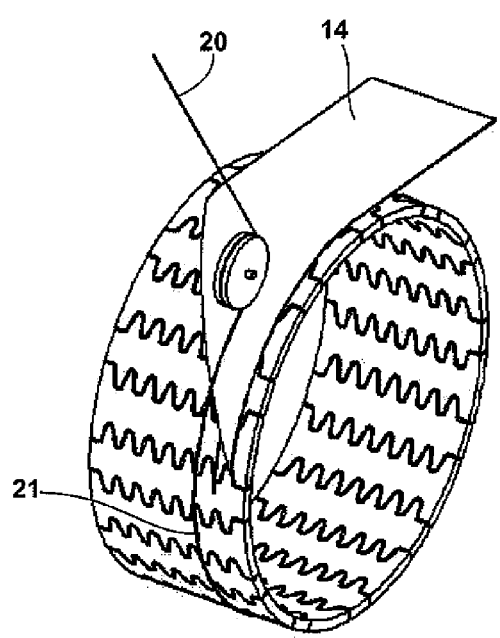
Figure 5:
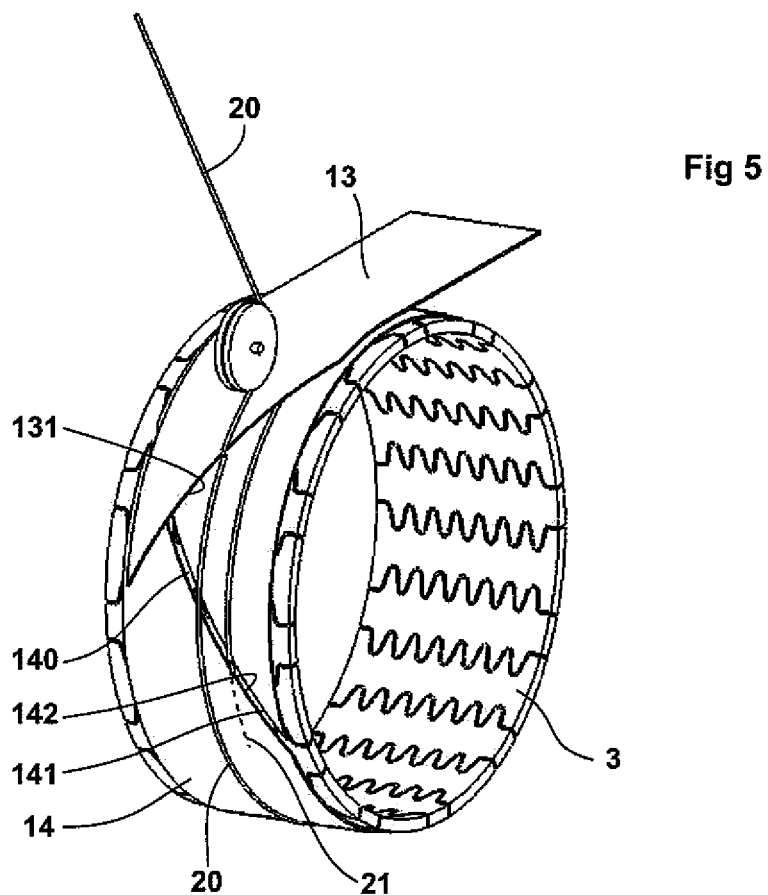
Figure 6:
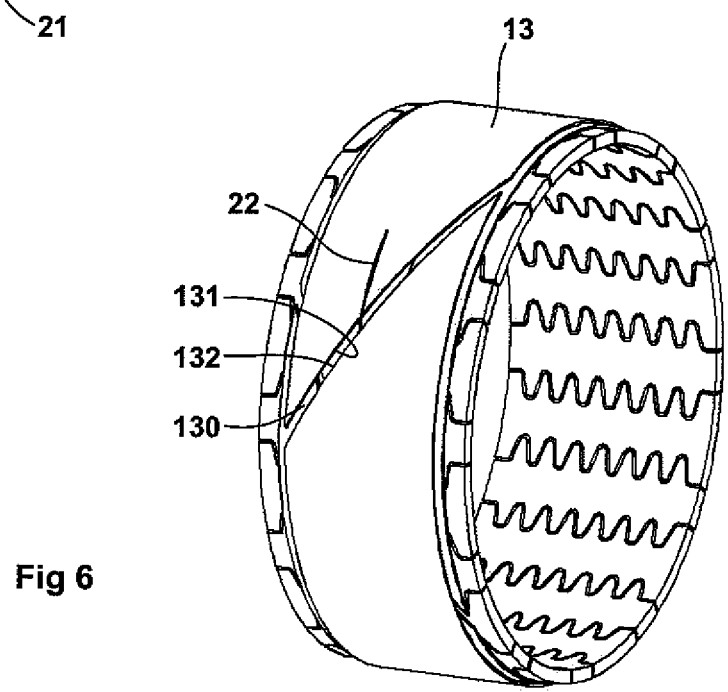

FIG. 2 is a view in radial section through the tire 1 and shows the chafers 170 and 171 intended to provide contact between the beads of the tire and the rim of the wheel. These chafers are in contact with the carcass reinforcing ply 15 and comprise a means allowing electricity to be conducted from the internal part as far as the external part in contact with the rim of the wheel. For preference, these chafers 170 and 171 are made using an electrically conducting rubber compound.

Finally, the tire 1 comprises scuff ribs 180 and 181. These scuff ribs are preferably made of a weakly electrically conducting rubber compound.

The carcass reinforcing ply 15 comprises a means 151 allowing electrical charge to be conducted from the radially external surface of the carcass reinforcing ply to the internal part of the chafers 170 and 171.

The carcass reinforcing ply 15 is formed, by way of illustration, by assembling widths 150 formed of threads coated with a weakly electrically conducting compound and between which, during the step of producing the said widths on the straight thread ply cutting machine, has been inserted a portion of strip 151 formed of threads coated in an electrically conducting compound, as described in the as yet unpublished patent application FR 0852 556 in the name of the applicant companies.

A continuous element 20, in this particular instance a strip formed of an electrically conducting rubber material, runs circumferentially over the radially external part of the crown reinforcing plies 13 and 14.

The internal leader 21 runs over the radially lower face of the reinforcing ply 14 to make electrical contact with the means 151 arranged on the carcass reinforcing ply. The external leader 22 runs over the radially external surface of the reinforcing ply 13 to make contact with the sublayer 12.

Electrical charge flows in succession through:
 the tread strip 11 which comprises means (111, 12) to establish an electrically conducting path between the radially external part of the tread strip intended to be in contact with the ground and the radially internal part 12 of the said tread strip 11, the external leader 22 of the continuous element 20, which is in contact with the sublayer 12, the internal leader which is in contact with the means 151 arranged on the carcass reinforcing ply 15, and the said means 151 which conducts electrical charge to the chafers (170, 171), the latter being intended to make contact with the wheel rim.

FIGS. 3, 4, 5 and 6 illustrate one embodiment of a crown reinforcing belt intended for building a tire according to the invention.

The crown belt is made on a cylindrical building form 3 that serves as a component receiving surface. This cylindrical form is rotated about its axis XX'. It is made up of circular elements that can be moved radially.

A means (not depicted) is able to deliver a continuous element, in this particular instance a thread 20 coated with an electrically conducting rubber compound, to an applicator means 4.

The thread leader 21 is laid directly on the receiving surface. The length of this internal leader may vary. Specifically, when the carcass reinforcing ply is electrically conductive, contact between the carcass ply and the internal leader may be made over a fairly short length. By contrast, when the carcass reinforcing ply is made of a weakly electrically conducting material, and the means 151 for removing electrical charge is localised in the azimuthal direction, it is sensible to run the internal leader 21 over the entire circumference of the radially lower face of the crown reinforcing belt, as has been illustrated in FIG. 4.

Figure 7:
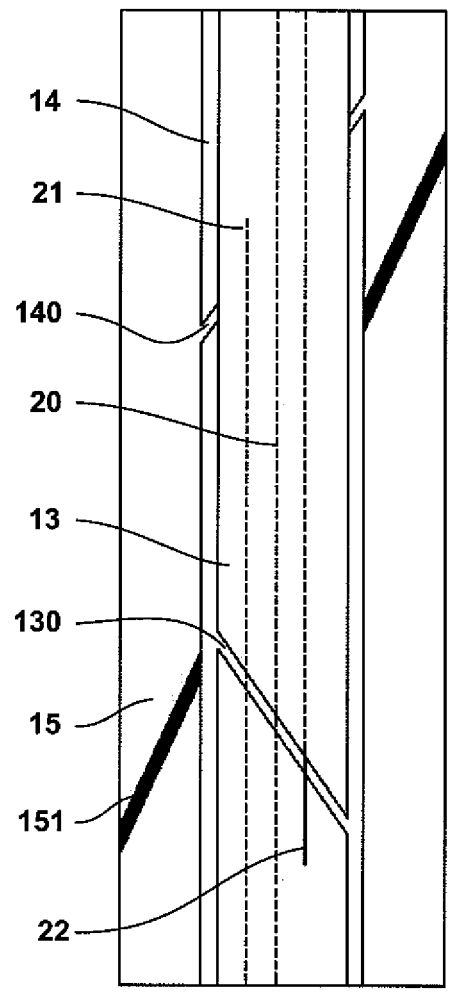
FIGS. 7 and 8 depict developed views of a reinforcing belt according to the invention, laid on a carcass reinforcing ply comprising a means of conducting electrical charge.
Figure 8:
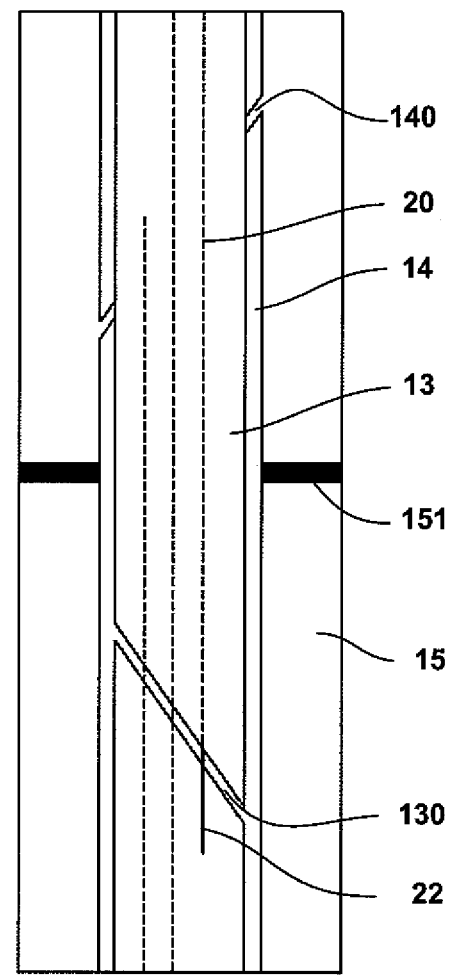

FIGS. 7 and 8 illustrate this case, in which the tire 1 comprises a carcass reinforcing ply the threads of which are coated with a weakly electrically conducting rubber compound. The means 151 able to conduct electrical charge from the radially external part of the carcass reinforcing ply to the chafers 170 and 171 is oriented radially as in the case of the tire illustrated in FIG. 1. The means 151 may also make an angle to the circumferential direction; in this particular case, the means 151 may consist of a strip of rubber made of an electrically conducting material.

In order to avoid an azimuthal operation aimed at superposing the internal leader and the means 151, it is possible for the internal leader 21 to be extended, causing it to make a full revolution, so that the said leader runs over the entire circumference of the internal face of the radially internal crown reinforcing ply 14.

Winding is then used to lay a first crown reinforcing ply 14 by causing the cylindrical form to achieve a full revolution. Steps are taken to ensure that the continuous linear element 20 runs over the upper surface of the ply 14.

The two circumferential ends 141 and 142 of the reinforcing ply 14 are butted together to form a butt joint 140. The thread 20 crosses from the radially upper part of the receiving surface 3 to the radially upper part of the reinforcing ply 14 passing between the two faces 141 and 142 of the butt joint 140 of the ply 14, as has been illustrated in FIG. 5.

The next portion 13 is laid by winding, in exactly the same way. The thread 20 then runs over the radially upper surface of the reinforcing ply 13 to form the external leader 22. The circumferential ends 131 and 132 of the ply 13 are butted together to form the butt joint 130 as has been illustrated by FIGS. 5 and 6 such that the thread 20 passes between the two faces 131 and 132 of the butt joint 130.

Thus, the length of thread continuously laid corresponds to the sum of the length of the internal leader, of the circumference of the crown reinforcing belt multiplied by the number of plies minus one, and the length of the external leader.

The number of reinforcing plies that make up the reinforcing belt is not limited to the two plies 13 and 14 used to support the present description. If the number of plies to be laid is higher, then the ply stacking operations need merely be repeated, ensuring that the continuous linear element 20 is passed between the faces of the circumferential ends that form the butt joint in each of the plies.

Likewise, the foregoing description relates to crown reinforcing plies of a length substantially equal to the circumference of the form 3. It should therefore be pointed out that the principles described hereinabove apply also to cases in which the crown reinforcing plies are formed by the juxtaposition in the circumferential direction of portions of narrow strip or to cases in which the threads are cast onto the receiving surface as described, for example, in publication EP 248 301.

As was mentioned in the foregoing paragraphs, the continuous linear element 20 may be formed from a thin strip made of an electrically conducting material. The width of the strip may beneficially range between 10 and 20 mm, with a thickness ranging between 0.1 mm and 1 mm.

The continuous linear element 20 may also be formed of one or more threads coated with an electrically conducting compound. In that case, it may prove advantageous for the continuous linear element to be laid in waves in the transverse direction, perpendicular to the circumferential direction, to prevent any possibility of the thread locally hampering movements of the crown belt in the radially direction. The amplitude of the wave patterns is determined according to the maximum possible radial expansion of the belt. It is also possible to choose a thread that has sufficient elastic properties so that an equivalent result can be achieved.

The invention claimed is:

1. A tire comprising a crown reinforcing belt, formed of a plurality of reinforcing plies superposed on one another, each reinforcing ply resulting from the circumferential winding of one or more ply portions comprising threads, parallel to one another, coated with a weakly electrically conducting rubber compound, and making a given angle with the said circumferential direction, in which tire the faces of the circumferential ends of the said portions are butted together to form a butt joint, wherein an electrically conducting continuous linear element runs circumferentially over the radially upper part of each of the plies and crosses from the radially upper part of a first reinforcing ply into the radially upper part of a second reinforcing ply superposed directly on it, passing between the two faces of a butt joint of said second reinforcing ply, and wherein said continuous element comprises an internal leader running over all or part of the radially lower face of the radially internal reinforcing ply of said belt and an external leader running over all or part of the circumference of the radially upper face of the radially external reinforcing ply of said belt.

2. The tire according to claim 1, wherein the internal leader runs over the entire circumference of the radially lower face of the radially internal ply of said crown reinforcing belt.

3. The tire according to claim 1, wherein the continuous linear element is formed of one or more threads coated with an electrically conducting rubber compound.

4. The tire according to claim 3, wherein the threads that make up the continuous linear element have sufficient elastic properties that they do not locally hamper the radial expansion of the crown reinforcing belt.

5. The tire according to claim 3, wherein the continuous linear element is wound in such a way as to form waves with respect to the transverse direction.

6. The tire according to claim 1, wherein the continuous linear element is formed of a thin narrow strip of electrically conducting rubber compound.

7. The tire according to claim 1, further comprising a tread strip formed of a weakly electrically conducting rubber compound, and in which tread strip there are means for conducting the electricity between the exterior surface of the tread strip that is intended to be in contact with the ground, and the radially internal part of the tread strip in contact with the external surface of the crown reinforcing belt over which said external leader runs, in which tire said external leader is positioned in such a way that it is in contact with said means arranged in the tread strip.

8. The tire according to claim 7, wherein the tread strip comprises a circumferential insert formed of an electrically conducting material connecting the exterior surface to the radially internal part of the tread strip in contact with the crown reinforcing belt.

9. The tire according to claim 7, and further comprising:
a bead region adapted to ensure close contact between the wheel and the tire, comprising bead reinforcing rings and chafers adapted to be in contact with the rim of a wheel, said chafers being formed from an electrically conducting rubber compound; and
one or more carcass reinforcing plies superposed on one another, anchored by their radially internal ends on the bead reinforcing rings, made up of threads coated with a weakly electrically conducting rubber compound which are parallel to one another and make a given angle with the circumferential direction, said carcass reinforcing ply being, at its centre, in contact with the radially lower face of the radially internal crown reinforcing ply of said belt, and comprising a means of conducting electricity from the radially upper face of the centre of the carcass reinforcing ply to the internal faces of the chafers, wherein said internal leader is positioned in such a way that it is in contact with said means arranged on the carcass reinforcing ply.

10. A method of producing a crown reinforcing belt intended for a tire assembly according to claim 1, comprising the steps of:
winding a leader of the continuous linear element onto a receiving surface;
laying down a first crown reinforcing ply by winding, running the continuous linear element over the radially external surface of said ply;
butting together the two circumferential ends of the first reinforcing ply to form a butt joint, passing the continuous linear element between the two faces of the butt joint;
laying down the next reinforcing ply by winding, running the continuous linear element over the radially external surface of said ply;
butting together the two circumferential ends of the reinforcing ply to form a butt joint, passing the continuous linear element between the two faces of the butt joint;
repeating the two previous operations as many times as required;
laying down the last reinforcing ply by winding, running the continuous linear element over the radially external surface of said ply to form the external leader; and
butting together the two circumferential ends of the reinforcing ply to form a butt joint, passing the continuous linear element between the two faces of the butt joint.

11. The method according to claim 10, wherein the receiving surface consists of a cylindrical form.

12. The method according to claim 10, wherein the receiving surface consists of a green tire that has been built.

\* \* \* \* \*